United States Patent
Frankenberger et al.

(10) Patent No.: US 7,329,891 B2
(45) Date of Patent: Feb. 12, 2008

(54) READ-OUT DEVICE AND METHOD FOR READING OUT X-RAYS STORED IN PHOSPHOR LAYERS

(75) Inventors: Jörg Frankenberger, Markt Schwaben (DE); Robert Fasbender, Ottobrunn (DE); Clemens Herrmann, München (DE); Johan Lamotte, Rotselaar (BE); Stephan Mair, Weilheim (DE); Horst Scherer, Unterhaching (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 0 days.

(21) Appl. No.: 11/351,077

(22) Filed: Feb. 9, 2006

(65) Prior Publication Data

US 2006/0180777 A1    Aug. 17, 2006

(30) Foreign Application Priority Data

Feb. 15, 2005    (EP)    ................................. 05101134

(51) Int. Cl.
  *G01T 1/105*    (2006.01)
(52) U.S. Cl. ..................................... 250/584
(58) Field of Classification Search ......... 250/584–587
  See application file for complete search history.

(56) References Cited

U.S. PATENT DOCUMENTS

| 4,963,739 | A | * | 10/1990 | Hishinuma | ................. | 250/587 |
| 5,038,037 | A | | 8/1991 | Saotome | | |
| 5,376,806 | A | | 12/1994 | Hejazi | | |
| 6,642,535 | B2 | | 11/2003 | Gebele et al. | | |
| 6,717,174 | B2 | * | 4/2004 | Karellas | ..................... | 250/582 |
| 6,858,861 | B2 | | 2/2005 | Gebele et al. | | |

(Continued)

FOREIGN PATENT DOCUMENTS

EP    1376615 A2    1/2004

(Continued)

OTHER PUBLICATIONS

Search Report from European Application No. 05101134.4 filed Feb. 15, 2005.

(Continued)

*Primary Examiner*—David Porta
*Assistant Examiner*—Marcus H Taningco
(74) *Attorney, Agent, or Firm*—Houston Eliseeva LLP

(57) ABSTRACT

In order to improve the picture quality of X-rays, a read-out control is provided for controlling a read-out device such that a first storage phosphor layer, which has a first thickness d1, is read out by the read-out device controlled in a first read-out mode, and a second storage phosphor layer, which has a second thickness d2 which is greater than the first thickness d1, is read out by the read-out device controlled in a second read-out mode, the second read-out mode being different from the first read-out mode. The scan parameters of the read-out device set in the first read-out mode are different from the scan parameters set in the second read-out mode in at least one scan parameter. The scan parameters are, for example, the size of the pixels, a pulse duration and/or intensity and/or width of a focus range of stimulation light, integration time and/or feed time of the detector.

22 Claims, 2 Drawing Sheets

U.S. PATENT DOCUMENTS

| | | |
|---|---|---|
| 2001/0006222 A1 | 7/2001 | Gebele et al. |
| 2004/0041099 A1 | 3/2004 | Gebele et al. |
| 2004/0224084 A1 | 11/2004 | Verreyken et al. |
| 2004/0232365 A1 | 11/2004 | Reiser et al. |
| 2005/0000448 A1 | 1/2005 | Guido et al. |
| 2005/0001181 A1 | 1/2005 | Leblans et al. |
| 2005/0003295 A1 | 1/2005 | Koninckx et al. |
| 2005/0035316 A1 | 2/2005 | Fasbender et al. |
| 2005/0247897 A1 | 11/2005 | Haug et al. |
| 2006/0091337 A1 | 5/2006 | Mair |

FOREIGN PATENT DOCUMENTS

EP  1 460 642 A1  9/2004

OTHER PUBLICATIONS

U.S. Appl. No. 60/715996, filed Sep. 9, 2005, Tahon et al.
U.S. Appl. No. 60/715995, filed Sep. 9, 2005, Tahon et al.
U.S. Appl. No. 60/716022, filed Sep. 9, 2005, Tahon et al.
U.S. Appl. No. 60/715994, filed Sep. 9, 2005, Tahon et al.

* cited by examiner

READ-OUT DEVICE AND METHOD FOR READING OUT X-RAYS STORED IN PHOSPHOR LAYERS

The invention relates generally to a read-out device and to a corresponding method for reading out X-rays stored in storage phosphor layers.

BACKGROUND OF THE INVENTION

One possibility for recording X-ray pictures is storing the X-ray radiation passing through an object, for example a patient, as a latent picture in a phosphor layer. In order to read out the latent picture, the phosphor layer is irradiated with stimulation light, and so stimulated into emitting emission light. The emission light, the intensity of which corresponds to the picture stored in the phosphor layer, is collected by an optical detector and converted into electrical signals. The electrical signals are further processed as required, and finally made available for analysis, in particular for medical/diagnostic purposes, when they are displayed on an appropriate display unit, such as a monitor or printer.

With generic read-out devices according to the prior art, the picture quality of the read out X-ray required or prescribed for a reliable medial diagnosis is not achieved in all applications.

SUMMARY OF THE INVENTION

It is an object of the invention to provide a read-out device and a corresponding method with which the highest possible picture quality of the read out X-ray is achieved.

In order to improve the picture quality of X-rays, a read-out control is provided for controlling a read-out device such that a first storage phosphor layer, which has a first thickness d1, is read out by the read-out device controlled in a first read-out mode, and a second storage phosphor layer, which has a second thickness d2 which is greater than the first thickness d1, is read out by the read-out device controlled in a second read-out mode, the second read-out mode being different from the first read-out mode. The scan parameters of the read-out device set in the first read-out mode are different from the scan parameters set in the second read-out mode in at least one scan parameter. The scan parameters are, for example, the size of the pixels, a pulse duration and/or intensity and/or width of a focus range of stimulation light, integration time and/or feed time of the detector.

DETAILED DESCRIPTION OF THE PREFERRED EMBODIMENTS

Figure 1:
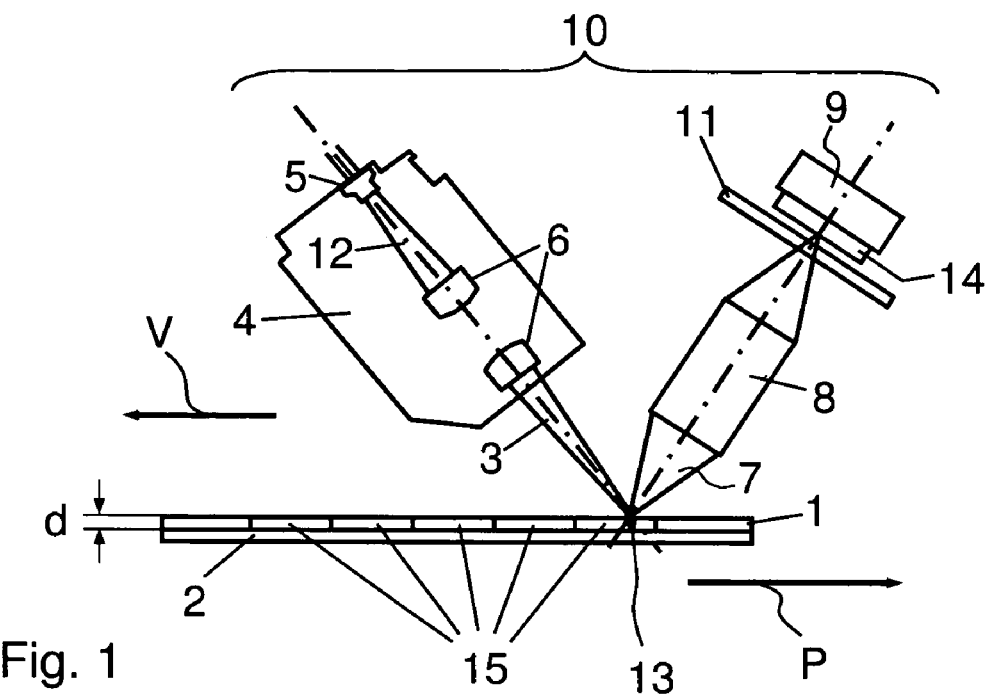
FIG. 1 shows a first variation of a read-out device.

According to the invention, a read-out control is provided which controls the read-out device in such a way that a first storage phosphor layer, which has a first thickness, is read out by the read-out device controlled in a first read-out mode, and a second storage phosphor layer, which has a second thickness which is greater than the first thickness, is read out by the read-out device controlled in a second read-out mode, the second read-out mode being different from the first read-out mode.

The invention is based upon the idea of controlling the read-out device dependent upon the thickness of the respective phosphor layer to be read out. This is achieved in that at least part of the scan parameters of the read-out device set when reading out the phosphor layer is set dependent upon the thickness of the respective phosphor layer to be read out. The scan parameters include preferably:

the size of the pixels of the X-ray picture read out,
the pulse duration and/or intensity of the stimulation light,
the width of the focus range of the stimulation light on the phosphor layer,
the integration time and sampling rate of the detector, and
the feed time of the detector and the relative speed with which the read-out device and the phosphor layer are moved relative to one another during the read-out.

According to the invention, the scan parameters set in the first read-out mode are different from the scan parameters set in the second read-out mode, in at least one scan parameter. This means that at least one scan parameter in the first read-out mode has another value than in the second read-out mode.

By means of the control according to the invention of the scan parameters of the read-out device dependent upon the thickness of the phosphor layer to be read out, improved adaptation both of the read-out conditions and the thickness of the phosphor layer to the respective medical use, which is also called application, is made possible. In this way, a respective optimal picture quality can be achieved for different applications. Different applications include but are not limited to X-rays of limbs, of the skull, of the spinal column, of the thorax, of the abdomen or of the pelvis.

In a first embodiment of the invention, when reading out a phosphor layer, the read-out device can produce a picture made up of a large number of pixels, the size of the pixels produced being smaller in the first read-out mode than in the second read-out mode. In this way, the resolution of the picture obtained is increased, and the picture quality is further improved.

The read-out device has an irradiation device for irradiating a phosphor layer with stimulation light which can stimulate the phosphor layer into emitting emission light. Moreover, the read-out device includes a detector for collecting emission light stimulated in the phosphor layer, it being possible for the detector and the phosphor layer to be moved relative to one another.

Preferably, the irradiation device is controlled by the read-out control such that the irradiation device emits stimulation pulses with a specific pulse duration, the pulse duration of the stimulation light pulses being shorter in the first read-out mode than in the second read-out mode. In this way, with each read-out of a pixel, in particular of a line of pixels, a smaller partial region of the phosphor layer is passed over with the stimulation light in the first read-out mode than in the second read-out mode. The stimulated partial regions of the phosphor layer are correspondingly smaller. The size of the partial regions stimulated can thus be adapted to the required size of the pixels.

It is moreover advantageous to control the irradiation device by means of the read-out control such that the intensity of the stimulation light in the first read-out mode is less than the intensity of the stimulation light in the second read-out mode. In this way, in the first read-out mode a diffusion of the stimulation light within the phosphor layer is reduced in comparison to the second read-out mode such that a higher picture definition is achieved. This applies in particular to so-called Powder Image Plates (PIP). With these PIP, the storage phosphor particles, which are substantially isotropic in form, are mixed in powder form with a binding agent and processed into a layer.

Preferably, a focussing device is provided for focussing the stimulation light on the storage phosphor layer, the stimulation light hitting the storage phosphor layer in a focus range, which is in particular linear, and the width of the focus range in the first read-out mode being smaller than in the second read-out mode. In this way, with each read-out of individual pixels, in particular of a whole line of pixels, a smaller partial region of the storage phosphor layer is passed over by the stimulation light in the first read-out mode than in the second read-out mode. In this way too, the picture definition is increased.

In a further preferred example, the detector is controlled by the read-out control such that the emission light is collected in a large number of time intervals during the relative movement, the time intervals being shorter in the first read-out mode than in the second read-out mode.

In the case of line detector which has a large number of light-sensitive elements arranged in a line, the time intervals are the so-called integration times within which the light-sensitive elements collect light and convert it into corresponding electrical signals. In the case of a non-locally resolving detector, such as a photomultiplier, the time intervals are sampling times within which the analogue signal produced by the detector is sampled. The sampling time is the reciprocal value of the so-called sampling frequency which is also called the sampling rate.

Overall, in this way a high resolution with at the same time reduced noise portions and reduced movement blur, which is caused by the relative movement of the detector and the storage phosphor layer are achieved in the first read-out mode, and so the picture quality is further improved.

Preferably, the detector and the phosphor layer are moved relative to one another with a relative speed, the relative speed being lower in the first read-out mode than in the second read-out mode. In this way too, the movement blur is reduced, and at the same time the signal/noise ratio of the picture data obtained is improved.

It is preferred that the first thickness of the first phosphor layer is between 100 and 750 µm. With phosphor layers in this range of thicknesses, the picture definition is only slightly effected by the diffusion of stimulation light in the layer, but at the same time a sufficiently high intensity of the emission light emitted by the phosphor layer is achieved. This has a particularly positive effect upon the picture quality with applications where picture definition is vital.

The second thickness of the second phosphor layer is preferably between 750 and 1000 µm. With phosphor layers in this thickness range, in applications in which a particularly high picture definition can be dispensed with, picture data with a particularly favourable signal/noise ratio and contrast can be obtained.

Preferably, the first and/or second phosphor layer used has needle-shaped storage phosphor structures. These phosphor layers are also called Needle Image Plates (NIP) and supply picture data with an exceptional signal/noise ratio and high picture definition.

FIG. 1 shows a first variation of a read-out device, which in the following example is also called a scanner. A phosphor layer 1 to be read out, which has a thickness d, is disposed on a support layer 2 and is irradiated with stimulation light 3 which is produced by a light source 4. The emission light 7 stimulated by the stimulation light 3 in the phosphor layer 1 is collected by a detector 9. The light source 4 and the detector 9, including an imaging device 8 and an optical filter 11, together form the scanner 10 which is moved in the feed direction V relative to the phosphor layer 1 during the read-out.

The light source 4 has several individual radiation sources 5, such as light diodes or laser diodes, and a focussing device 6 which focus the stimulation light bundles 12 coming from the radiation sources 5 onto the phosphor layer 1.

The focussing device 6 has two oblong cylinder lenses which extend substantially parallel to the individual radiation sources 5 arranged in a line. The divergent stimulation light bundles 12 coming from the individual radiation sources 5 are bundled by the focussing device 6 and strike the phosphor layer 1 as a convergent radiation bundle of the stimulation light 3. The divergent stimulation light bundles 12 of the individual radiation sources 5 overlap at right angles to the plane of FIG. 1 in such a way that the convergent radiation bundle describes a continuous stimulation light line 13 on the phosphor layer 1 extending at a right angle to the plane of FIG. 1.

The emission light 7 stimulated and radiated in the region of the stimulation light line 13 in the phosphor layer 1 is collected by a detector 9 such as to be locally resolved. For this, the detector 9 has a large number of light-sensitive detector elements 14 which are arranged along a line extending at right angles to the plane of FIG. 1. The emission light 7 emitted in the region of the stimulation light line 13 on the phosphor layer 1 is reproduced on the light-sensitive detector elements 14 of the detector 9 by an imaging device 8. The detector 9 is preferably in the form of a CCD or photodiode line.

Suitable as an imaging device 8 are preferably microlenses which are arranged along a line extending at right angles to the plane of FIG. 1. Alternatively, gradient index lenses are also suitable for this, in particular self-focussing lenses which are also arranged in a line extending at right angles to the level of the Figure. Preferably, the individual regions 15 are reproduced by the imaging device 8 on the light-sensitive surfaces 14 of the detector 9 on the scale of 1:1.

In the example shown, the scanner 10 is moved by a conveyance mechanism (not shown) in feed direction V over the latent phosphor layer 1, different linear regions 15 of the phosphor layer 1 being successively stimulated by the stimulation light line 13, and the respectively emitted emission light 7 being collected, locally resolved, by the light-sensitive detector elements 14 of the detector 9.

Preferably, the light source 4 is disposed in front of the detector 9 in relation to feed direction V, i.e. the scanner 10 runs with the light source 4 over the phosphor layer 1. In this way it is possible for a larger portion of the stimulation light 3 diffused in the phosphor layer to be diffused in the direction of regions 15 which have already been read out, whereas only a smaller portion of the stimulation light 3 is diffused in the direction of the regions 15 of the phosphor layer 1 which have not yet been read out. In this way, intensity and definition losses due to the diffusion of stimulation light 3 within the phosphor layer 1 can be reduced.

In the example shown, the scanner 10 is moved over a fixed phosphor layer 1. Of course, the above also applies when the scanner 10 is fixed and the phosphor layer 1 disposed on the support layer 2 is conveyed in movement direction P relative to this. The same applies similarly to embodiments with which the scanner 10 is moved in feed direction V, and the phosphor layer 1 is moved in movement direction P.

While the scanner 10 is moved in feed direction V relative to the phosphor layer 1, the stimulation light line 13 passes over individual regions 15 of the phosphor layer 1, and stimulates these, one after the other, into emitting emission light 7 which is collected by the detector 9 for each of the individual regions 15.

For the movement by the width of a region 15, the detector 9 requires a feed time Tv. In the course of this movement, the light-sensitive surfaces 14 of the detector 15 collect the emission light 7 emitted from the region 15 during an integration time $T_1$.

The width of the regions 15 in feed direction V is typically between approximately 10 μm and 500 μm. The crossways extension of the light-sensitive surfaces 14 of the detector 9 at right angles to the direction of the detector line is typically between approximately 10 μm and 600 μm.

Preferably, the crossways extension of the light-sensitive surfaces 14 is greater than the width of the regions 15 in feed direction V. For example, the width of the regions 15 is approximately 50 μm, whereas the crossways extension of the light-sensitive surfaces 14 is approximately 400 μm. The width of a single region 15 in feed direction V is in this case given by the width of the section of the phosphor layer 1 which the stimulation light line 13 stimulates into emitting emission light 7 while it is being fed in feed direction V within the feed time $T_v$. The local resolution in feed direction V, i.e. the smallest possible width of an individual region 15 is determined here by the width of the focus range of the stimulation light line 13 in feed direction V.

For better clarity, the regions 15 of the phosphor layer 1 and the light-sensitive surfaces 14 of the detector 9 in FIG. 1 are all greatly enlarged, and not shown truly to scale.

Advantageously, the integration time $T_1$ is shorter than the feed time $T_v$, i.e. $T_1 < T_v$. In this way, the thermally generated dark noise is reduced with respect to methods known from the prior art, and so overall the signal/noise ratio is improved. Because the detector 9 only passes over part of the width of the region 15 when collecting emission light 7 during the integration time $T_1$, information losses which can be caused by so-called movement blur, are furthermore reduced.

Figure 2:
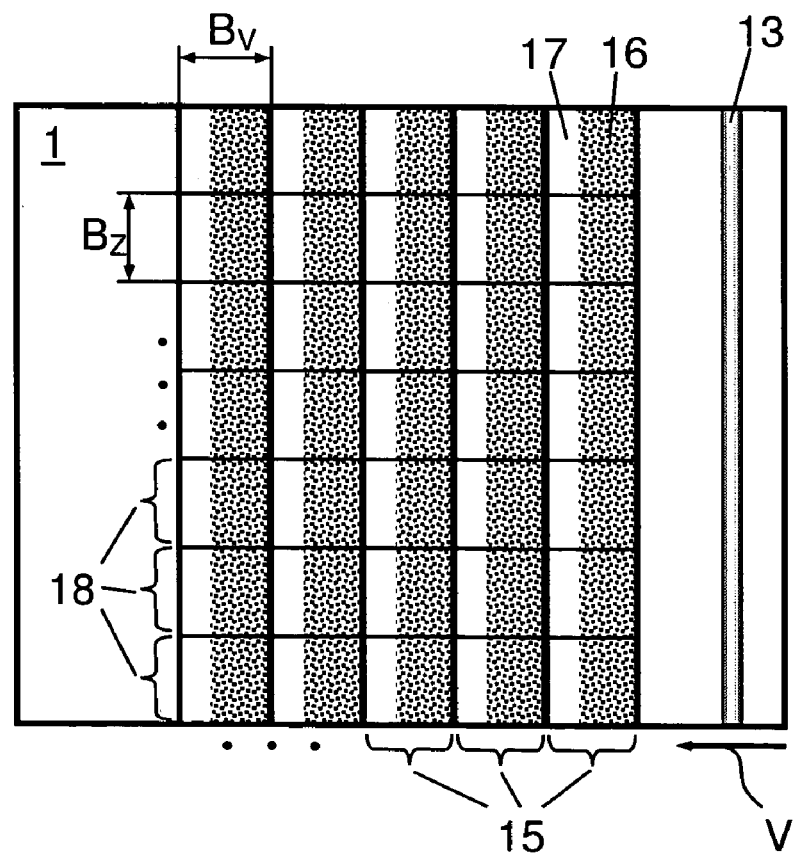
FIG. 2 shows an example of a phosphor layer to be read out.

FIG. 2 shows a top view of an example of a phosphor layer 1 to be read out. In the representation chosen here, the individual regions 15 of the phosphor layer 1 are also shown greatly enlarged—as in FIG. 1—for reasons relating to better clarity.

On the phosphor layer 1, a stimulation light line 13 is drawn and moved with the light source 4 and the detector 9, including the imaging device 8 and the filter 11 (see FIG. 1) in feed direction V relative to the storage phosphor layer 1, and thus passes over the individual regions 15. For feeding by the width of a region 15, the detector 9 or the stimulation light line 13 requires a specific feed time $T_v$, which, in the case of a constant relative speed, corresponds to the quotient of the width $B_v$ of the individual regions 15 and the relative speed.

The light source 4 is controlled in such a way that only a respective first partial region 16 of the regions 15 is irradiated directly with stimulation light, whereas a second partial region 17 of the regions 15 is not irradiated directly with stimulation light. The light source 4 here only emits stimulation light when the stimulation light line 13 passes over the first partial region 16. The light source 4 is then switched off so that from now on "virtual stimulation light line" passes over the second partial region 17 without irradiating this with stimulation light. Correspondingly, only the first partial region 16 is stimulated into emitting emission light by direct irradiation with stimulation light. The second partial region 17, on the other hand, is stimulated into emitting emission light by the stimulation light hitting the first partial region 16 and partially diffused in the phosphor layer 1 in feed direction V.

The light source 4 is controlled here by specifying a stimulation time $T_s$ during which the light source 4 is switched on with the movement of the stimulation light line 13 over a region 15. After the stimulation time $T_s$ is over, the light source 4 remains switched off until the stimulation light line 13 has reached a region 15 which is the next to be read out, upon which the irradiation cycle described can start once again by turning on the light source 4.

The aperture of the detector 9 which depends upon the extension of the light-sensitive surfaces 14 of the detector 9 and the imaging device 8 thus also passes over the individually stimulated regions 15 of the phosphor layer 1, one after the other. The light-sensitive surfaces 14 of the detector 9 arranged in a line thus collect the emission light 7 respectively emitted by the linear regions 15.

The detector 9 is thus controlled in a way such that it only collects emission light 7 emitted from the region 15 during an integration time $T_1$. The integration time $T_1$ is shorter here than the feed time $T_v$ which the detector 9 and the light source 4 require in order to cover a distance corresponding to the width $B_v$ of the regions 15 in feed direction V. The integration time $T_1$ is preferably synchronised with the stimulation time $T_s$, i.e. these begin at the same time and are of the same duration.

With respect to methods known from the prior art, with which the integration time is identical to the feed time, the shortening of the integration time with respect to the feed time described here leads to considerably reduced dark noise. Because the aperture of the detector 9 consequently passes over a narrower section of the region 15 in feed direction V while the emission light is collected during the shorter integration time, at the same time the movement blur and so a resulting loss of information during read-out is reduced.

As can also be seen in FIG. 2, the individual regions 15 are each sub-divided into a large number of individual pixels 18. This sub-division is achieved by collecting the emission light emitted from the linear regions 15 with a linearly formed detector 9, the width $B_z$ of the pixels 18 corresponding to the extension of the individual light-sensitive detector elements 14 in the line direction of the detector 9. The width Bz of the pixels 18 is typically between approximately 10 μm and 500 μm, preferably approximately 50 μm.

The emission light 7 emitted by the individual pixels 18 and collected line by line by the corresponding light-sensitive surfaces 14 of the detector 9 is converted into corresponding detector signals in the detector 9 which represent the picture information of the latent X-ray picture read out.

The read-out of the phosphor layer 1 is preferably controlled by a pulse signal. The pulse signal has a periodic progression of individual rectangular pulses, the pulse duration of which corresponds to the stimulation time $T_s$ and the integration time $T_1$. The distance in time between the ascending sides of two subsequent pulses corresponds here to the feed time $T_v$. With the periodical pulse signal of this example, the feed time $T_v$ thus corresponds to the period duration of the pulse signal.

Preferably, as already explained, the stimulation time $T_s$ and the integration $T_1$ are identical, i.e. the stimulation and collection of the emission light happen synchronously. Alternatively, however, it is also possible to control the read-out process with two different pulse signals which differ from one another in the duration of the pulses (i.e. the stimulation time $T_s$ is then different from the integration time $T_1$) and/or the phase position of the pulses relative to one another (i.e. the stimulation time $T_s$ begins at a different point in time than does the integration time $T_1$).

With this variation of the scanner 10, at least part of the scan parameters of the scanner 10 during read-out is chosen dependent upon the thickness d of the phosphor layer 1 to be read out or upon a read-out control (not shown). Alternatively or in addition, at least part of the scan parameters can be set dependent upon the body part, the X-ray of which is stored in the phosphor layer to be read out.

Scan parameters here are preferably understood as being one or more of the following parameters, already described in greater detail above:

the size, i.e. the width $B_z$ or $B_y$ of the pixels 18 of the X-ray picture read out;
the stimulation time $T_s$ and the pulse duration of the stimulation light pulses;
the intensity of the stimulation light 3;
the width of the focus range 13 of the stimulation light 3 on the phosphor layer 1;
the integration time $T_1$ of the detector 9;
the feed time $T_v$ of the detector 9 and the relative speed with which the scanner 10 and the phosphor layer 1 are moved relative to one another during the read-out.

The read-out of a phosphor layer 1 with a first thickness d1 occurs with different scan parameters than the read-out of a phosphor layer 1 with a second thickness d2 which is greater than the first thickness d1.

Alternatively or in addition, the read-out of a phosphor layer 1, in which an X-ray of a first body part such as a limb or a skull is stored, occurs with different scan parameters than the read-out of a phosphor layer 1 in which an X-ray of a second body part, such as a spinal column, a thorax, an abdomen or a pelvis, is stored.

Figure 3:
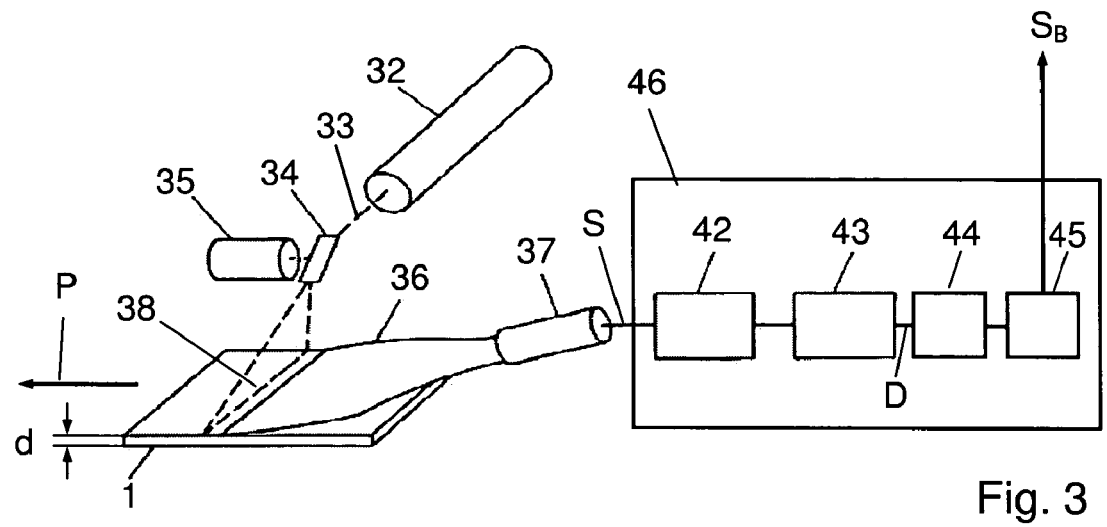
FIG. 3 shows a second variation of a read-out device.

FIG. 3 shows a second variation of a read-out device for reading out a phosphor layer 1. A laser 32 produces a stimulation light beam 33 which is deflected by a deflection element 34 set in rotation by a motor 35 such that this moves along a line 38 over the phosphor layer 1 to be read out. The deflection element 34 is preferably in the form of a mirror, in particular a polygon mirror or a galvanometer mirror.

During the movement of the stimulation light beam 33 along the line 38, the phosphor layer 1 emits emission light dependent upon the X-ray information stored therein, which is gathered by an optical gathering device 36, for example a light conductor bundle, conveyed on and collected by an optical detector 37, preferably a photomultiplier, coupled to the gathering device 36, and converted into a corresponding analogue detector signal S.

The detector signal S is fed into a processing unit 46 in which picture signal values $S_B$ are deduced for individual pixels of the X-ray picture read out. By conveying the phosphor layer 1 in conveyance direction P, a successive read-out of individual lines 38 is achieved, and so a two-dimensional X-ray picture made up of individual pixels with a respectively associated picture signal value $S_B$ is obtained. If the number of lines 38 read out in conveyance direction V is for example 1500, for example with 1000 pixels respectively per line 38, a total of 1500×1000 pixels each with an associated picture signal value $S_B$ are obtained for the X-ray picture read out.

In the embodiment shown here, the analogue detector signal S is first of all filtered through a low pass filter 42, higher frequency portions of the detector signal S, in particular noise portions, being eliminated or at least reduced.

The filtered, analogue detector signal S is fed into a digitizing device 43, and there sampled and digitized with a pre-specified sampling frequency, a digital detector signal value D being obtained in digital units for each sampling process. The sampling frequency, which is also called the sampling rate, is typically between 1 and 12 MHz.

The sampling of the analogue detector signal S in the digitizing device 43 preferably happens according to the so-called Sample and Hold Principle with which the respective current analogue signal height of the detector signal S given by the digitizing unit 43 at a sampling time is held and converted into a corresponding digital detector signal value D.

From the digital detector signal values D are intermediately stored in a storage unit 44, the individual picture signal values $S_B$ are finally established in a calculation unit 45, in that two or more detector signal values D are combined into one pixel and from this, for example by forming an average value, a picture signal value $S_B$ belonging to this pixel is calculated.

The sampling frequency is preferably chosen such that for each individual pixel along the line 38, at least two digital detector signal values D are obtained, from which a picture signal value $S_B$ respectively belonging to a pixel can be calculated.

With this variation of the read-out device according to the invention too, at least part of the scan parameters is chosen or set by a read-out control (not shown) dependent upon the thickness d of the phosphor layer 1 to be read out. Alternatively or in addition, at least part of the scan parameters can be set dependent upon the body part, the X-ray of which is stored in the phosphor layer to be read out.

Scan parameters here are preferably to be understood as being one or more of the following parameters, already described above:

the size of the pixels of the X-ray picture read out;
the intensity of the stimulation light 33;
the width of the focus range, i.e. of the line 38 of the stimulation light 33 on the phosphor layer 1;
the sampling frequency or sampling rate when sampling the analogue detector signal S; and
the relative speed with which the phosphor layer 1 is moved relative to the line 38 of the stimulation light during the read-out.

The read-out of a phosphor layer 1 with a first thickness d1 occurs with different scan parameters than the read-out of a phosphor layer 1 with a second thickness d2, which is greater than the first thickness d1.

Alternatively, or in addition, the read-out of a phosphor layer 1, in which an X-ray of a first body part, such as a limb or a skull is stored, takes place with different scan parameters than the read-out of a phosphor layer 1, in which an X-ray of a second body part, such as a spinal column, a thorax, an abdomen or a pelvis, is stored.

Figure 4:
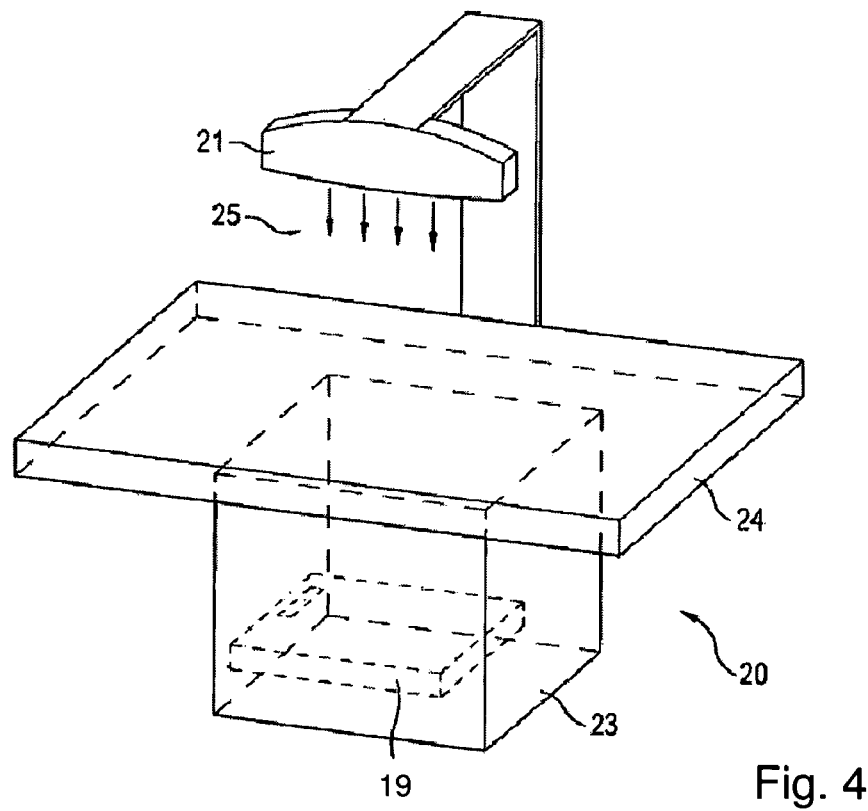
FIG. 4 shows an example of a radiography system.

FIG. 4 shows an example of a radiography system for recording X-rays on phosphor layers. In this example, a phosphor layer (as illustrated e.g. in FIGS. 1 to 3) is located in an X-ray cassette 19 which is inserted in an X-ray table 20. The X-ray table 20 includes an X-ray foot 23 in which the X-ray cassette 19 is located, and a supporting surface 24 positioned on the X-ray foot 23 on which, when taking X-rays, patients or their limbs can be laid. An X-ray radiation source 21 is disposed over the supporting surface 24, and this can emit X-ray radiation 25 with different energy and intensity in the direction of the supporting surface 24.

The energy limit of the X-ray radiation used for the X-ray is chosen or correspondingly set by a recording control (not shown) dependent upon the respective thickness d (see FIG. 1 or 3) of the phosphor layer used. With an X-ray using a phosphor layer with a first thickness d1, a first energy limit is set for the X-ray radiation. With an X-ray using a phosphor layer with a second thickness d2 which is greater than the first thickness d1, a second energy limit is set for the X-ray radiation, which is greater than the first energy limit.

The energy limit of the X-ray radiation is to be understood here as meaning the maximum energy of the respective X-ray photons. The value of the respective energy limit of the X-ray photons, e.g. 50 keV corresponds here to the value of the high voltage set in the X-ray tubes in which the X-ray radiation is produced, therefore 50 kV in the aforementioned example.

By controlling the radiography system dependent upon the thickness of the phosphor layer used in the recording, improved adaptation of the recording conditions and of the thickness of the phosphor layer to the respective medical application is achieved. In this way, a respectively optimal picture quality can be achieved for different applications. Different applications include X-rays of limbs, the skull, the spinal column, the thorax, the abdomen or the pelvis.

Preferably, the first energy limit of the X-ray radiation of the radiography system is in the range of between 40 and 70 keV. With these energies, in the first phosphor layer an X-ray picture is stored which, despite the lesser thickness of the phosphor layer, results in a relatively high intensity of the emission light, and also a high signal/noise ratio during read-out.

The second energy limit of the X-ray radiation of the radiography system is preferably in the range of between 70 and 150 eV. With these energies, in the second phosphor layer an X-ray picture is stored which, due to the greater thickness of the phosphor layer, results in an equally relatively high intensity of the emission light, and also a high signal/noise ratio during read-out.

Preferably, during an X-ray, the intensity of the X-ray radiation using a phosphor layer with a first thickness is greater than with an X-ray using a phosphor layer with a second thickness which is greater than the first thickness. In this way, still better adaptation of the picture quality of the recorded X-ray required for the respective application is achieved.

The invention claimed is:

1. A read-out device for reading out X-ray information stored in phosphor layers, comprising:
   a read-out control for controlling the read-out device such that,
   a first storage phosphor layer, which has a first thickness d1, is read out from the read-out device controlled in a first read-out mode,
   a second storage phosphor layer, which has a second thickness d2 which is greater than the first thickness d1, is read out from the read-out device controlled in a second read-out mode, the second read-out mode being different from the first read-out mode; and
   means to produce a picture made up from a large number of pixels during the read-out of the storage phosphor layer, the size ($B_z$, $B_y$) of the pixels being smaller in the first read-out mode than in the second read-out mode.

2. The read-out device according to claim 1, further comprising an irradiation device for irradiating a storage phosphor layer with stimulation light which can stimulate the storage phosphor layer into emitting emission light, and the irradiation device being controlled by the read-out control such that the irradiation device emits stimulation light pulses with a specific pulse duration $T_s$, the pulse duration $T_s$ of the stimulation light pulses being shorter in the first read-out mode than in the second read-out mode.

3. A read-out device according to claim 1, further comprising:
   an irradiation device for irradiating the first and second storage phosphor layers with stimulation light that stimulates the storage phosphor layers into emitting emission light, and the irradiation device being controlled by the read-out control such that the intensity of the stimulation light in the first read-out mode is less than the intensity of the stimulation light in the second read-out mode.

4. The read-out device according to claim 3, wherein the first thickness d1 of the first storage phosphor layer is between 100 and 750 µm.

5. The read-out device according to claim 3, wherein the second thickness d2 of the second storage phosphor layer is between 750 and 1000 µm.

6. The read-out device according to claim 3, the first and/or the second storage phosphor layer having needle-shaped storage phosphor structures.

7. A read-out device according to claim 1, further comprising:
   a detector for collecting emission light stimulated in the first and second storage phosphor layers, the detector and the storage phosphor layers being moved relative to one another, and the detector being controlled by the read-out control such that the emission light is collected in a large number of time intervals $T_1$ during the relative movement, the time intervals $T_1$ in the first read-out mode being shorter than in the second read-out mode.

8. The read-out device according to claim 7, further comprising a detector for collecting emission light stimulated in the storage phosphor layer, the detector and the storage phosphor layer able to be moved relative to one another with a relative speed, the relative speed being smaller in the first read-out mode than in the second read-out mode.

9. The read-out device according to claim 7, wherein the first thickness d1 of the first storage phosphor layer is between 100 and 750 µm.

10. The read-out device according to claim 7, wherein the second thickness d2 of the second storage phosphor layer is between 750 and 1000 µm.

11. The read-out device according to claim 7, the first and/or the second storage phosphor layer having needle-shaped storage phosphor structures.

12. The read-out device according to claim 1, wherein the first thickness d1 of the first storage phosphor layer is between 100 and 750 µm.

13. The read-out device according to claim 1, wherein the second thickness d2 of the second storage phosphor layer is between 750 and 1000 µm.

14. The read-out device according to claim 1, the first and/or the second storage phosphor layer having needle-shaped storage phosphor structures.

15. A read-out device for reading out X-ray information stored in phosphor layers, comprising:
   a read-out control for controlling the read-out device such that,
   a first storage phosphor layer, which has a first thickness d1, is read out from the read-out device controlled in a first read-out mode,
   a second storage phosphor layer, which has a second thickness d2 which is greater than the first thickness d1, is read out from the read-out device controlled in a second read-out mode, the second read-out mode being different from the first read-out mode;

an irradiation device for irradiating a storage phosphor layer with stimulation light which can stimulate the storage phosphor layer into emitting emission light; and a focusing device for focusing the stimulation light onto the storage phosphor layer, the stimulation light hitting the storage phosphor layer in a focus region which is linear, a width of the focus region being smaller in the first read-out mode than in the second read-out mode.

16. The read-out device according to claim 15, wherein the first thickness d1 of the first storage phosphor layer is between 100 and 750 μm.

17. The read-out device according to claim 15, wherein the second thickness d2 of the second storage phosphor layer is between 750 and 1000 μm.

18. The read-out device according to claim 15, the first and/or the second storage phosphor layer having needle-shaped storage phosphor structures.

19. A method for reading out X-ray information stored in storage phosphor layers, comprising the steps of:

reading out first data from a first storage phosphor layer having a first thickness d1 with a read-out device controlled in a first read-out mode;

reading out second data from a second storage phosphor layer having a second thickness d2 greater than the first thickness d1 with the read-out device controlled in a second read out mode; and producing a picture made up from a large number of pixels during the read-out of the storage phosphor layer, the size ($B_z$, $B_y$) of the pixels being smaller in the first read-out mode than in the second read-out mode.

20. A method as claimed in claim 19, wherein the read-out device comprises an irradiation device for irradiating the first and second storage phosphor layers with stimulation light, the irradiation device being controlled such that the intensity of the stimulation light in the first read-out mode is less than the intensity of the stimulation light in the second read-out mode.

21. A method as claimed in claim 19, wherein the read-out device is controlled in the first read-out mode in which a detector collects emission light stimulated in the first storage phosphor layer in first time intervals as the detector moves relative to the first storage phosphor layer; and the read-out device is controlled in the second read out mode, in which the detector collects the emission light stimulated in the storage phosphor layer in second time intervals, wherein the first time intervals are shorter than the second time intervals.

22. A method for reading out X-ray information stored in storage phosphor layers, comprising the steps of:

reading out first data from a first storage phosphor layer having a first thickness d1 in a read-out device controlled in a first read-out mode by irradiating the first storage phosphor layer with stimulation light from an irradiation device and focusing the stimulation light with a focusing device onto the first storage phosphor layer to stimulate the storage phosphor layer into emitting emission light, the stimulation light hitting the first storage phosphor layer in a focus region that is linear; and reading out second data from a second storage phosphor layer having a second thickness d2 greater than the first thickness d1 with the read-out device controlled in a second read-out mode, wherein a width of a focus region is smaller in the first read-out mode than in the second read-out mode.

* * * * *